J. BERG.
REVERSIBLE PERCOLATOR.
APPLICATION FILED MAR. 18, 1910.
969,028.
Patented Aug. 30, 1910.
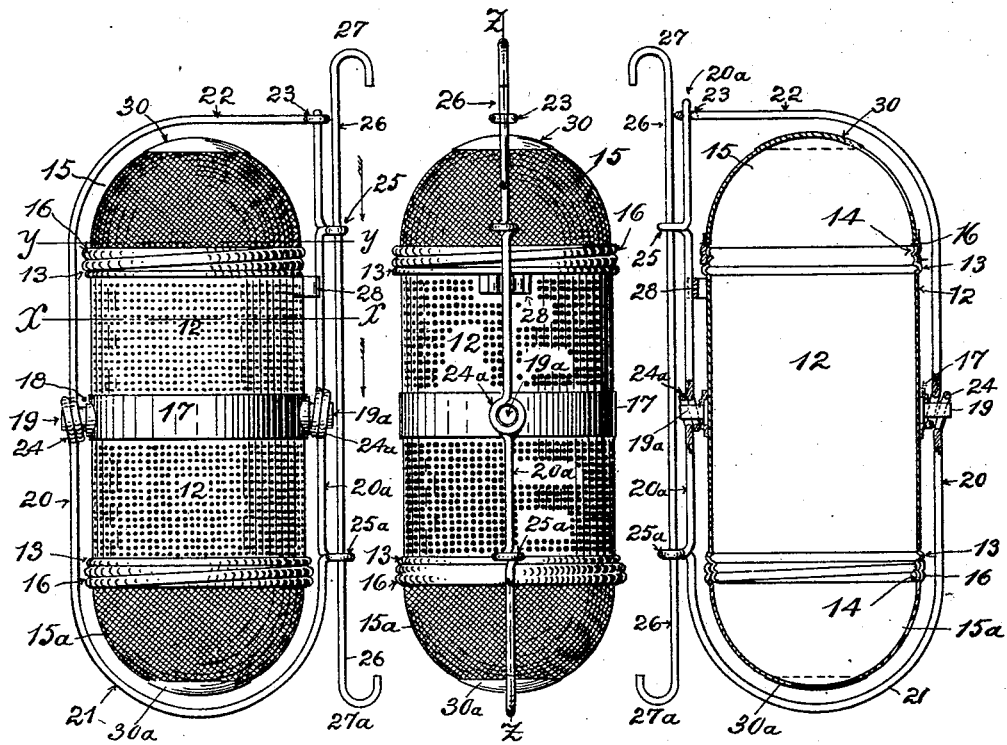
FIG.1.  FIG.2.  FIG.3.
FIG.4.  FIG.5.  FIG.6.
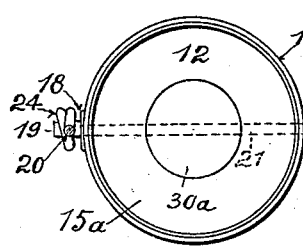 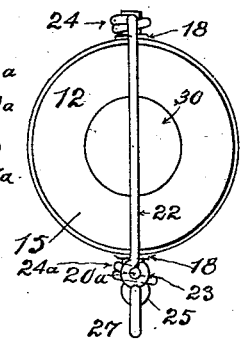 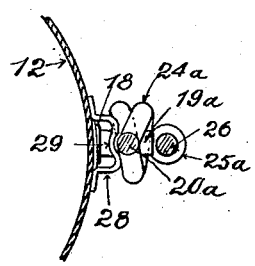
Witnesses:
C. B. Knudsen
A. G. Peterson
Inventor:
John Berg.
By Michael J. Stark & Sons,
Attorneys.

UNITED STATES PATENT OFFICE.

JOHN BERG, OF CHICAGO, ILLINOIS.

REVERSIBLE PERCOLATOR.

969,028.  Specification of Letters Patent.  Patented Aug. 30, 1910.

Application filed March 18, 1910. Serial No. 550,114.

*To all whom it may concern:*

Be it known that I, JOHN BERG, a citizen of the United States, and resident of Chicago, in the county of Cook and State of Illinois, have invented certain new and useful Improvements in Reversible Percolators; and I do hereby declare that the following description of my said invention, taken in connection with the accompanying sheet of drawings, forms a full, clear, and exact specification, which will enable others skilled in the art to which it appertains to make and use the same.

This invention has general reference to improvements in reversible percolators; and it consists, essentially, in the novel and peculiar combination of parts and details of construction as hereinafter first fully set forth and described and then pointed out in the claims.

The object of this invention is the production of a reversible percolator that shall be very effective and efficient in operation, and comparatively reasonable in cost.

In the drawings already referred to, which serve to illustrate this invention more fully, Figure 1 is a side elevation of my improved percolator. Fig. 2 is a similar view, taken at right angles to that shown in Fig. 1. Fig. 3 is a longitudinal sectional elevation on line $z$ $z$ of Fig. 2. Fig. 4 is a sectional plan on line $x$ $x$ of Fig. 1. Fig. 5 is a plan, and Fig. 6 is a sectional plan, on line $y$ $y$ of Fig. 1, of a fragment of the device, the figure being drawn on an enlarged scale, and illustrating particularly the catch mechanism that retains the container in normal position.

Like parts are indicated by corresponding symbols of reference in all the figures.

This percolator comprises a container, consisting of a central, preferably cylindrical, shell 12, made by preference of perforated sheet metal. This shell is open at both ends and has near its ends outwardly-projecting beads 13, and at its ends outwardly-rolled or pressed screw-threads 14, as shown in Fig. 3. These ends are adapted to receive dome-shaped caps, 15, 15$^a$, which caps are preferably made from wire-cloth, and they are provided with sheet-metal bands 16, that are screw-threaded and adapted to engage the screw-threaded ends of the shell 12. This shell 12 is reinforced in its middle by a band 17, soldered to said shell and provided at diametrically opposite places with protuberances 18, to receive trunnions, 19, 19$^a$, which trunnions are preferably commercial rivets of proper size, soldered into the said protuberances with their heads and having their cylindrical portion projecting from said protuberances.

The container described is suspended or journaled in a frame, preferably made from wire, and formed from a single piece and comprising two parallel members 20, 20$^a$, a lower arch 21, and an upper, partly arched portion 22, the latter portion terminating in an eye 23, adapted to receive the upper end of the wire 20$^a$. In approximately the middle of the members 20, 20$^a$, there are formed eyes 24, 24$^a$, which serve as bearings for the trunnions 19, 19$^a$, and on the member 20$^a$ there are formed above and below said bearings, further eyes 25, 25$^a$, adapted to receive a suspending-rod 26, which latter rod slides in the eyes 25, 25$^a$, and it has crooks 27, 27$^a$, at its ends by which the device may be suspended in a coffee, or tea-pot or other vessel, not shown.

The shell 12 has near one end a loop 28, in which there is a depression 29, Fig. 6, adapted to engage the frame-member 20$^a$, and thereby to prevent the container from rotating in its bearings.

In operation the container 12 is removed from its wire-frame by spreading the members 20, 20$^a$, to free one of the trunnions from its bearing, which can be readily accomplished owing to the fact that the wire frame is resilient, after which one of the caps is removed and the coffee, tea, or other substance placed in the shell 12 and then the cap replaced and the container returned to its normal position in the wire-frame. When necessary or desirable, the container is reversed by rotating it upon its trunnions, the loop 28 being permitted to pass from the wire-member 20$^a$ above the trunnion 19$^a$ and to engage the same below said trunnion, in an obvious manner.

The arched portion 21, and the upper member 22 of the frame serve to protect the caps 15, 15$^a$, from being dented, and in order to prevent denting thereof when the container is removed from its frame, I place reinforcing plates 30, 30$^a$, on the apex of each cap.

In manufacturing this device I prefer to form the wire-frame complete, except that the rod 26 is not placed in position. I then dip the frame into a bath of molten tin which will have the effect of heavily coating the wire with a protective coating of tin, and also thoroughly uniting the parts, after which the rod 26 with one of its crooks 27 formed thereon, is placed in position and then the other crook formed thereon, thereby preventing said rod from being withdrawn from the frame.

Having thus fully described this invention, I claim as new and desire to secure to me by Letters Patent of the United States—

1. As an improved article of manufacture, a pivoted, reversible percolator, comprising a container, including a perforated shell, removable caps on said shell, trunnions on approximately the center of said shell, a frame, said frame having bearings adapted to receive said trunnions, and a catch on said shell adapted to retain said shell in normal position, said frame having guard-members reaching over the ends of said container, said frame being resilient, whereby by spreading said frame said container may be removed from, and inserted in said frame, as described.

2. A pivoted, reversible percolator, comprising a container including a perforated shell, removable caps on said shell, trunnions on approximately the center of said shell, and a frame for said container, said frame being formed from a single piece of wire and comprising two substantially parallel members, a lower arch, an upper, substantially arched member, there being eyes in the parallel members adapted to receive said trunnions, and a catch on said shell adapted to retain said shell in a normally vertical position.

3. A pivoted, reversible percolator, comprising a container including a perforated shell, removable caps on said shell, trunnions on approximately the center of said shell, and a frame within which said shell is pivoted, said frame having bearings adapted to receive said trunnions and a rod by which said frame may be suspended, said frame being resilient, whereby by spreading said frame, said container may be removed from said frame.

In testimony that I claim the foregoing as my invention, I have hereunto set my hand the 16th day of March, 1910, in the presence of two subscribing witnesses.

JOHN BERG.

Attest:
  MICHAEL J. STARK,
  J. E. STARK.